(12) United States Patent
Rocca-Serra

(10) Patent No.: US 9,726,241 B2
(45) Date of Patent: Aug. 8, 2017

(54) BRAKE ASSEMBLY WITH PARTICLE CAPTURE

(71) Applicant: TALLANO TECHNOLOGIE, Paris (FR)

(72) Inventor: Christophe Rocca-Serra, Paris (FR)

(73) Assignee: TALLANO TECHNOLOGIE, Paris (FR)

( * ) Notice: Subject to any disclaimer, the term of this patent is extended or adjusted under 35 U.S.C. 154(b) by 0 days.

(21) Appl. No.: 14/398,929

(22) PCT Filed: Nov. 4, 2013

(86) PCT No.: PCT/EP2013/072890
§ 371 (c)(1),
(2) Date: Nov. 4, 2014

(87) PCT Pub. No.: WO2014/072234
PCT Pub. Date: May 15, 2014

(65) Prior Publication Data
US 2015/0233436 A1    Aug. 20, 2015

(30) Foreign Application Priority Data
Nov. 8, 2012 (FR) ..................................... 12 60594

(51) Int. Cl.
*F16D 65/00* (2006.01)
*F16D 55/225* (2006.01)

(52) U.S. Cl.
CPC ....... *F16D 65/0031* (2013.01); *F16D 55/225* (2013.01)

(58) Field of Classification Search
CPC combination set(s) only.
See application file for complete search history.

(56) References Cited

U.S. PATENT DOCUMENTS

| 8,191,691 B2 * | 6/2012 | Gelb | ..................... F16D 65/847 |
|---|---|---|---|
|  |  |  | 188/264 AA |
| 2008/0083333 A1* | 4/2008 | Yokoi | ................ B01D 46/0056 |
|  |  |  | 95/277 |
| 2010/0096226 A1 | 4/2010 | Gelb |  |

FOREIGN PATENT DOCUMENTS

| CH | 687 013 A5 | 8/1996 |  |
|---|---|---|---|
| DE | 42 40 873 A1 | 6/1994 |  |
| DE | 29506916 U1 * | 6/1995 | ............. F16D 55/02 |

(Continued)

OTHER PUBLICATIONS

Machine translation of DE 29506916 (no date).*
(Continued)

*Primary Examiner* — Nicholas J Lane
(74) *Attorney, Agent, or Firm* — Miller, Matthias & Hull LLP

(57) ABSTRACT

Nonpolluting brake assembly comprising a rotor, a pad comprising friction material capable of releasing particles resulting from abrasion, an autonomous suction device for drawing off said particles which comprises an intake opening arranged in the immediate vicinity of the pad and the rotor, a collection chamber for collecting the particles, an impeller driven by the rotor by means of a roller pressing on the rotor, for drawing off the particles through the opening and propelling them into the collection chamber, such that the particles are trapped as close as possible to their emission.

10 Claims, 4 Drawing Sheets

(56) References Cited

FOREIGN PATENT DOCUMENTS

DE        196 43 869 A1    5/1998
FR          2 751 390 A1    1/1998

OTHER PUBLICATIONS

Machine translation of DE 4240873 (no date).*
International Search Report and Written Opinion issued in related PCT Application No. PCT/EP2013/072890; report dated Nov. 4, 2013.

* cited by examiner

BRAKE ASSEMBLY WITH PARTICLE CAPTURE

CROSS-REFERENCE TO RELATED APPLICATION

This Application is a 35 USC §371 US National Stage filing of International Application No. PCT/EP2013/072890 filed on Nov. 4, 2013, and claims priority under the Paris Convention to French Patent Application No. 12 60594 filed on Nov. 8, 2012

FIELD OF THE DISCLOSURE

The present invention relates to nonpolluting brake assemblies intended notably for use on road or rail vehicles. The invention relates in particular to brake assemblies capable of capturing by suction the particles and dust resulting from abrasion that are emitted by friction braking. It is known that these particles are harmful to health when released into the environment.

BACKGROUND OF THE DISCLOSURE

Systems or devices for capturing dust particles resulting from the abrasion of friction braking have already been proposed, specifically in patents FR2815099 and U.S. Pat. No. 8,191,691. These known solutions are complex to implement and have a negative impact on the proper cooling of the brake disc and therefore on braking performance.

A need therefore exists for improving the solutions for capturing the dust and particles resulting from braking, in order to eliminate some or all of the above disadvantages.

SUMMARY OF THE DISCLOSURE

To this end, the present invention proposes a nonpolluting brake assembly comprising:
  a rotor,
  a movable pad intended to press against said rotor to brake it, the pad comprising friction material capable of releasing particles resulting from abrasion,
  an autonomous suction device for drawing off said particles, the suction device comprising:
    an intake opening,
    a collection chamber for collecting the particles,
    a pipe leading from the intake opening to the collection chamber,
    a impeller driven by the rotor by means of a roller pressing on the rotor, for drawing off the particles and propelling them into the collection chamber,
the intake opening being arranged in the immediate vicinity of the pad and the rotor, and the suction device being integrated in the vicinity of the pad, such that the particles are captured as close as possible to their emission.

With these arrangements, the suction device captures particles as close as possible to their emission and avoids having to encase the rotor in order to capture the particles; in the invention, the rotor cooling is not substantially reduced by the presence of the suction device, and therefore the braking performance is not affected by the presence of the suction device.

Further, the reduced dimensions of the suction device allow good integration into the rotor surroundings, and in particular in the vicinity of the brake pad.

In addition, the construction of the suction device is particularly simple: the impeller driving arrangement requires no external power source and no maintenance. Indeed the suction device requires no external piping, no external connection, and is therefore autonomous; this favors reliability.

In various embodiments of the invention, one or more of the following arrangements may be used:
  the height of the intake opening relative to the rotor surface may be between 0.5 mm and 2 mm, and preferably about 1 mm; this feature maximizes the amount of particles collected;
  the circumferential dimension of the intake opening may be less than 10 mm, preferably about mm, so that the influence on braking performance is minimized;
  the roller can be pressing on the rotor outside the area swept by the pad; whereby the drive roller has no influence on the rotor surface swept by the pad and does not degrade brake performance;
  the device may further comprise a check valve to prevent any backflow of particles from the collection chamber; thereby preventing an undesired inverse operation when moving in reverse;
  the impeller and roller may be arranged coaxially; so that the dimensions and production cost are minimized;
  the collection chamber may comprise a filter of fibrous media; so that all particles are trapped in the filter;
  the collection device is connected to a caliper or to a brake anchor plate by means of a support bracket; thereby facilitating installation of the device;
  the collection device is connected to the caliper or to a brake anchor plate with biasing towards the rotor; such that the bearing pressure of the roller on the rotor is properly controlled;
  the device may further comprise an auxiliary intake opening, symmetrically arranged on the opposite side of the rotor disk; such that only one impeller is required to treat both sides of the disc,
  the impeller may be preferably interposed between the intake opening and the collection chamber having a filter therein; whereby the suction loss is reduced since the impeller pushes the air into the filter (and does not suck air from the filter)

BRIEF DESCRIPTION OF DRAWINGS

Other features, objects, and advantages of the invention will be apparent from the following description of two embodiments of the invention, given by way of non-limiting examples. The invention will also be better understood by reference to the accompanying drawings in which.

DETAILED DESCRIPTION OF THE DISCLOSURE

In the various figures, the same references designate identical or similar elements.

Figure 1:
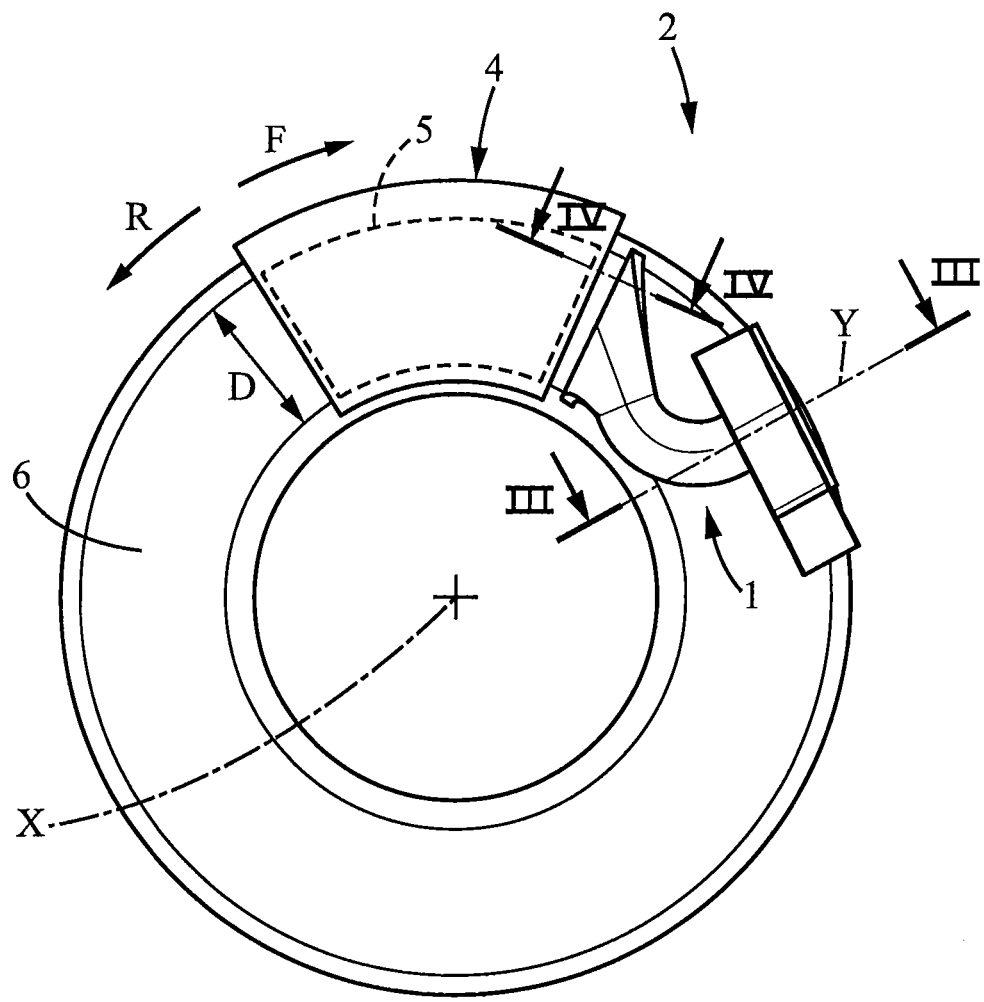
FIG. 1 is a side view of a brake assembly according to a first embodiment of the invention equipped with a suction device.

FIG. 1 shows a brake assembly 2 according to a first embodiment of the invention which concerns a disc brake configuration. Such a disc brake configuration is very common in automobiles, commercial vehicles, heavy trucks, buses, and rail rolling stock, as well as in two-wheelers. In this configuration, the braking action is applied to a rotor called a 'disc' that is rigid with the rim of the wheel or with the axle shaft but is distinct from the wheel rim itself.

However, the invention also relates to a braking configuration where the braking is applied directly on the wheel rim, for example as is used in rolling stock such as tramways, subways, or conventional trains. It is also possible to apply the invention to other configurations such as a drum brake.

There are increasing amounts of particles released by braking systems due to the increase in vehicular traffic, particularly in urban areas. Medical studies confirm the toxicity of these particles to the respiratory system of people and to health in general. It is therefore important to significantly reduce the emission of these particles into the environment, which the present invention aims to do.

Even if one endeavors to use frictionless braking systems such as regenerative or eddy current braking whenever possible, friction braking systems cannot be eliminated entirely, as they are effective at all speeds and can be used to maintain a vehicle at still while stationary.

Friction braking is based on a rotor turning about an axis X, on which a pad presses against to create friction to reduce its speed while converting the kinetic energy into heat. The rotor in question may be the wheel rim itself or a disc dedicated to the braking function, as was already mentioned above.

Figure 2:
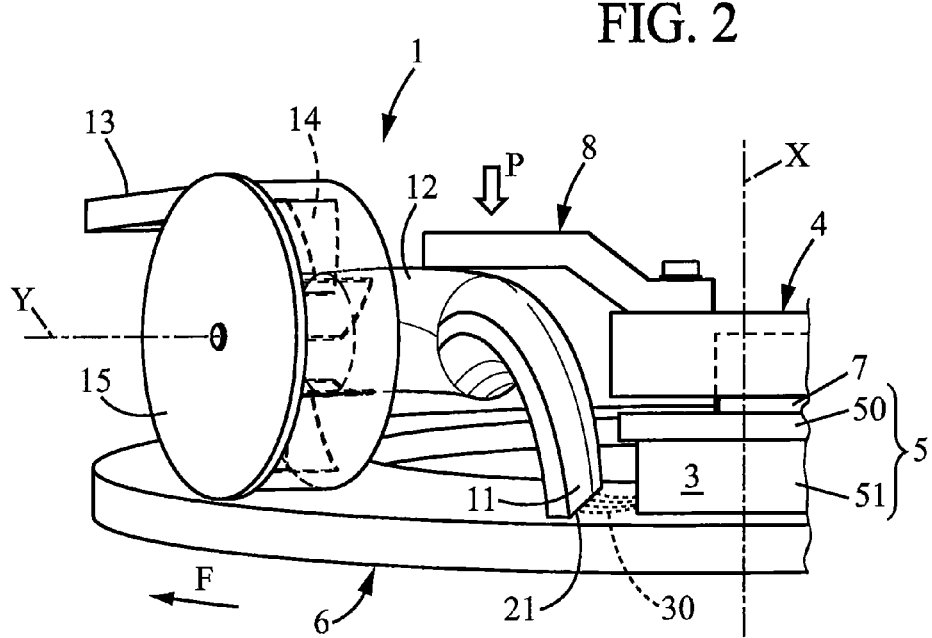
FIG. 2 is a schematic perspective view of the brake assembly of FIG. 1.

In the example illustrated in FIGS. 1 to 4, the brake assembly 2 comprises a rotor 6 in the form of a disc of uniform thickness secured rigidly to the wheel to be braked (or wheels of the axle to be braked), and a pad 5 intended to press in axial direction X on said rotor in order to brake it, the pad 5 being movably mounted relative to a brake caliper 4. In the conventional configuration shown, there are in fact two pads 5, which can be biased towards each other by the effect of pistons 7, sandwiching the rotor and thereby producing a force parallel to the axial direction of the wheel X. In FIG. 2, only the elements located above the disk are presented; the second pad is not shown.

Each brake pad 5 (or 'brake shoe') comprises a metal base 50 and a friction body 51 comprising friction material 3 capable of releasing particles 30 resulting from abrasion due to friction.

In other configurations not shown in the figures, there may be only one pad exerting a radial force in the direction of the wheel axis X, for example such as in conventional rolling stock where the braking occurs on a peripheral annular area of the wheel rim. In this case, there is not really a 'caliper' but rather a pad support 4'.

More particularly, the brake assembly 2 includes a suction device 1 capable of capturing the dust and particles that constitute the residue from the abrasion caused by braking. The suction device 1 has reduced dimensions that facilitate its integration within the immediate surroundings of the caliper 4.

More specifically, the suction device 1 comprises:
- an intake opening 11, arranged in the immediate vicinity of the pad 5 and the rotor 6,
- a collection chamber 13 for collecting the particles of friction material 3, said chamber comprising a filter,
- a pipe 12 leading from the intake opening 11 to the collection chamber 13, said pipe also possibly called a 'case', or 'housing',
- an impeller 14 driven by the rotor by means of a roller 15 pressing on the rotor, said impeller drawing off the particles through the intake opening 11 and propelling them into the collection chamber, said impeller being arranged inside the pipe 12.

The intake opening 11 (may also be called 'intake port') is shown as a mouth 21 placed in a plane parallel to the rotor surface 60, therefore perpendicular to the axis X of the rotor. This opening 21 is preferably located less than 5 mm from the surface of the rotor, and more preferably less than 2 mm from the surface of the rotor.

Figure 4:
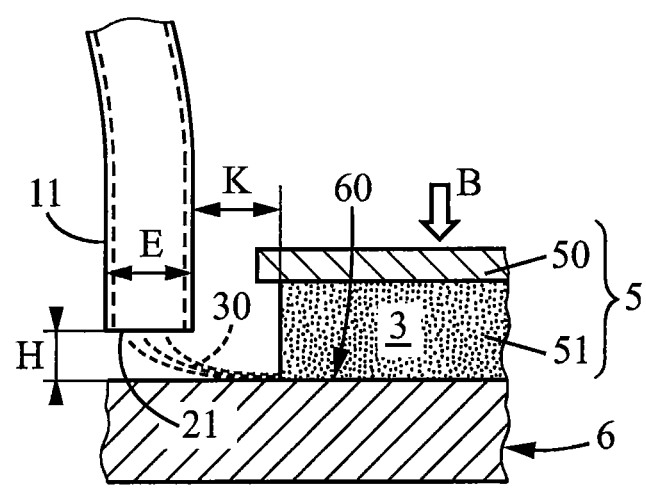
FIG. 4 shows a sectional detail of the suction area.

As shown in FIG. 4, the height H of the mouth 21 of the intake opening 11 relative to the rotor surface may be chosen to be between 0.5 mm and 2 mm, and in particular may be chosen to be 1 mm, to optimize suction of the particles while avoiding contact with the disc and preventing degradation of the plastic material of the mouth in contact with the disc which may be very hot.

The mouth 21 of the intake opening 11 is substantially in the shape of a rectangle extending in the radial direction over the entire radial distance D of the rotor swept by the pad, for example typically from 3 cm to 6 cm, and extends in the circumferential direction over a distance E of less than 10 mm, preferably less than 5 mm. In particular, a dimension in the circumferential direction of about 4 mm may be chosen. Note that the thickness of the wall remains small relative to this circumferential dimension E.

The intake opening 11 is positioned at a circumferential distance K downstream of the friction body 51 of the pad 5 (see FIG. 4), which is preferably between 2 mm and 10 mm; one can select an optimum distance K of around 5 mm. If the intake opening 11 is positioned parallel to the downstream edge of the friction body 51 of the pad 5, the distance K is constant; however, this could be otherwise, especially if the intake opening 11 is aligned on a radius or if the downstream edge of the friction body 51 of the pad 5 is not strictly radial in orientation.

Given the dimensions listed above, the area of the mouth 21 of the intake opening 11 can be less than 5 cm$^2$, preferably less than 2 cm$^2$. In this manner, the presence of the intake opening has a negligible effect on rotor cooling.

As the particles 30 are suctioned directly where they are released, at the interface between the pad 5 and the rotor surface 60, this eliminates the need to install any additional element which encases a portion of the rotor, and therefore maintains cooling performance.

It is thus possible to suction off nearly all the particles 30 due to abrasion from braking, specifically more than 95% of all particles, whether magnetic or nonmagnetic. Particles or dust of any size are captured, including those of micrometric and even nanometric dimensions.

In a advantageous aspect, the bearing from the roller 15 occurs over an annular area 66 located outside the area 65 swept by the pad (FIG. 3), which does not interfere with the rotor surface 60 swept by the pad and thus minimizes the influence of the presence of the roller 15 on braking performance.

In a preferred aspect, the impeller 14 and the roller 15 are arranged coaxially about an impeller axis Y perpendicular to the wheel axis X.

The impeller 14 in the example shown is rotatably mounted on a bearing 16 arranged in the impeller housing 17. The impeller comprises a plurality of blades 24 for generating a centrifugal movement acting to drive the air towards the collection chamber 13, and a central shaft 18 received in the bearing 16 and which has an end 19 for connecting with the roller. In the example shown, the impeller diameter is 5 cm, although this diameter can be adjusted according to the space available between the disc and the wheel rim, and also to the axial length of the impeller and the suction requirements related to the size of the pad 5 and to the brake application considered.

The drive roller 15 is mounted on the connecting end 19 of the shaft 18 so as to rotate with the impeller about axis Y. The peripheral edge 66 of the roller presses against the surface of the rotor. The drive roller 15 is for example made of aluminum, although a high performance plastic may also be chosen. It should be noted that axis Y passes through axis X, to allow the roller to roll with minimized drag.

In an advantageous aspect, the impeller 14 and the roller 15 could also form a single piece, for example made of high temperature plastic material.

The pipe 12 and the housing 17 may be made from PVC (polyvinyl chloride) plastic; the intake opening 11 is made for example of high temperature PVC or polyvinylidene fluoride or PEEK (polyether ether ketone), withstanding temperatures of up to 250° C. or even above 300° C.

The operation of the coupling assembly will now be explained. As the rotor turns, in particular in the direction of rotation 'F' corresponding to the forward movement of the vehicle, the roller 15 is made to rotate which in turn drives the impeller. The centrifugal impeller then creates a negative pressure at the intake opening.

It is possible to adjust the diameter of the roller and the volume of the impeller to obtain a suction rate that corresponds to the rate of ejection of the particles, which is substantially the linear velocity of the rotor surface. The Applicant has found that this suction rate corresponds to an optimum which allows capturing more or less all the particles, without causing premature wear of the friction material; too high of a value would be detrimental because it would force the intake of unstable particles located between the pad and the rotor surface, resulting in premature wear of the pad.

In a specific example among the many possible choices, the rotational speed of the impeller can be 17,000 revolutions/min for a vehicle speed of 50 Km/h, for a disc diameter that is a conventional diameter in motor vehicles.

It should be noted that the majority of the particles 30 emitted by the braking device are generated when braking at moderate or high speeds; the amount of particles ejected when braking at low speeds is not significant.

In an optional preferred aspect, the suction device 1 further comprises a check valve 9 arranged on the pipe, for example between the intake opening 11 and the impeller 14 or, as illustrated, between the impeller and the collection chamber. Thus, when the wheel and the rotor (and therefore the impeller) rotate in a direction 'R' corresponding to reverse motion of the vehicle, this arrangement prevents the particles from being drawn out of the collection chamber.

It is possible, of course, to place a suction device 1 on each side of the disc, meaning two similar suction devices symmetrically arranged one on either side of the disc.

Figure 6:
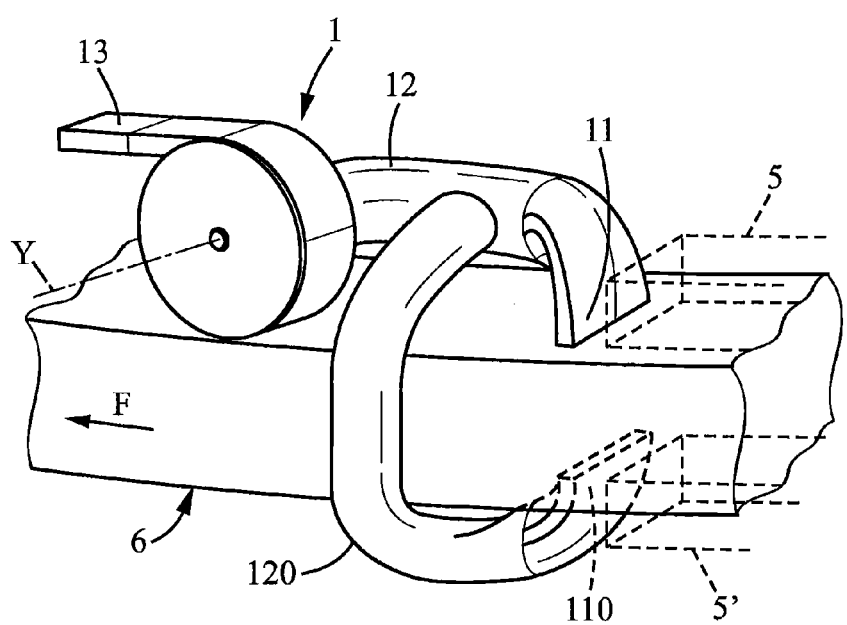
FIG. 6 is a schematic perspective view of a brake assembly in a variant of the first embodiment of the invention.
Figure 3:
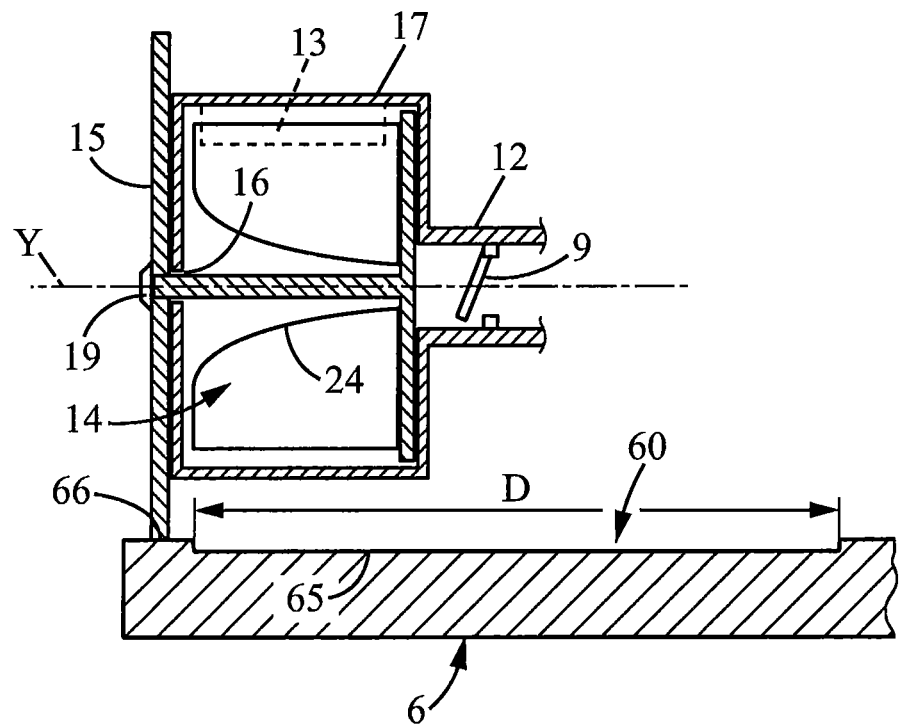
FIG. 3 is a partial vertical sectional view of the suction device of FIG. 1.

However, in an optional advantageous aspect, as is shown in FIG. 6, the suction device 1 may include an auxiliary intake opening 110, arranged symmetrically on the side opposite the rotor disc. In this manner a single impeller can draw particles off two pads 5,5' sandwiching the disc. An auxiliary pipe 120 connects the auxiliary opening 110 to the main pipe 12, bypassing the radially outer area of the disc.

Concerning the mounting of the suction device 1, it may be secured to the caliper or secured directly to the pad. Alternatively the suction device 1 can be secured to the brake anchor plate or to the stub axle. In the example shown, the suction device 1 is secured to the caliper by a support bracket 8 (see FIG. 2). It can be arranged so that this support bracket 8 has a certain elasticity in order to bias the suction device in the direction of the rotor along the axial direction X.

Advantageously, such biasing 'P' towards the rotor contributes to keeping the bearing pressure of the roller 15 on the rotor surface substantially constant regardless of manufacturing and assembly tolerances.

This biasing effect may, however, be obtained by assembly with a more conventional spring (not shown).

In an advantageous aspect, the weight of the suction device 1 does not exceed 50 grams, depending on the materials used, or possibly even 30 grams, which allows limiting the influence of the presence of the device on the dynamic behavior of the wheel and vehicle assembly.

Figure 5:
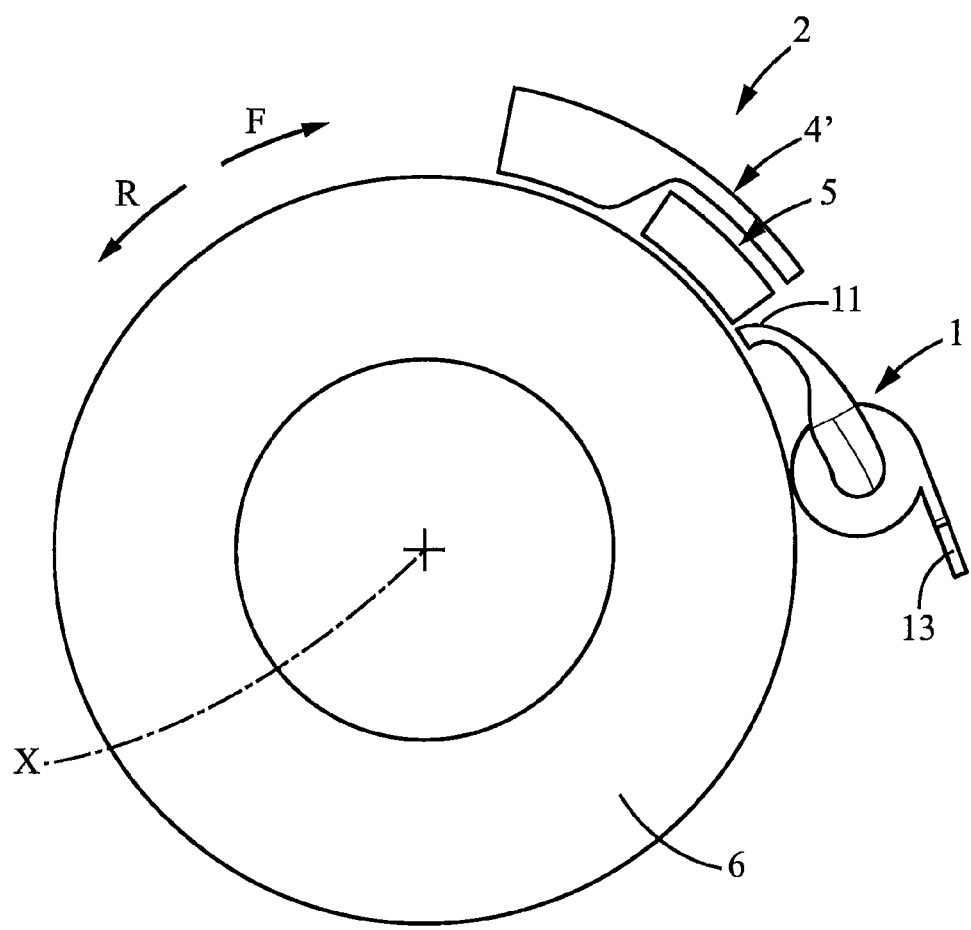
FIG. 5 is a side view of a brake assembly according to a second embodiment of the invention, equipped with a suction device.

In FIG. 5, the brake pad exerts inward radial pressure toward the wheel axle. As in the previous configuration, the suction device 1 is arranged downstream of the pad 5, in the normal direction of travel 'F'; it may be secured, similar to what was discussed above, to a pad support 4'.

For vehicles which may travel in either direction, such as urban rail vehicles, it is possible to have a suction device on each side of the pad provided they are equipped with the above-mentioned check valve 9.

It should be noted that several alternatives can be considered within the context of the present invention. For example, the drive roller 15 could bear on an annular surface within the area swept by the pad 5. In another example, the roller could bear on the disc edge. It could also be arranged to have an intermediate gear between the roller and the impeller, for example to adjust the optimum speed of rotation or to have the impeller axis independent of the axis of rotation of the roller.

The shape of the pipe and of the housing could be adapted to the space limitations around the pad, the mouth of the intake opening could be slightly angled relative to the disc surface, and the area adjacent to the intake opening could have any suitable shape.

The collection chamber could be placed at any suitable location dissimilar from the one shown in the figures.

The friction body 51 could have any shape, and may include discontinuous elements.

For maintenance of the system, one can plan at each pad change, to empty the collection chamber, replace the fibrous filter, or even replace the suction device.

The invention claimed is:

1. A nonpolluting brake assembly comprising:
   a rotor,
   a movable pad intended to press against said rotor in order to brake the rotor, the pad comprising friction material capable of releasing particles resulting from abrasion,
   an autonomous suction device for drawing off said particles, said suction device comprising:
   an intake opening,
   a collection chamber for collecting the particles,
   a pipe leading from the intake opening to the collection chamber,
   an impeller driven by the rotor by means of a roller pressing on the rotor, for drawing off the particles through the opening and propelling them into the collection chamber, wherein the intake opening is arranged in the immediate vicinity of the pad and the rotor, namely at a distance less than 5 mm from the rotor surface, and at a circumferential distance less than 10 mm from the brake pad, and wherein the autonomous suction device is integrated in the vicinity of the pad, such that the particles are captured close to their emission,
wherein the rotor is a disc and the roller bears on a side planar face of the disc, over an annular area not swept by the pad.

2. The brake assembly according to claim 1, wherein the height of the intake opening relative to the rotor surface is between 0.5 mm and 2 mm.

3. The brake assembly according to claim 1, wherein the circumferential dimension (E) of the intake opening is less than 10 mm.

4. The brake assembly according to claim 1, further comprising a check valve to prevent any backflow of particles from the collection chamber.

5. The brake assembly according to claim 1, wherein the impeller and roller are arranged coaxially.

6. The brake assembly according to claim 1, wherein the collection chamber comprises a filter of fibrous media.

7. The brake assembly according to claim 1, wherein the suction device is connected to a caliper or to a brake anchor plate by means of a support bracket.

8. The brake assembly according to claim 1, wherein the suction device is connected to a caliper or to a brake anchor plate with biasing towards the rotor.

9. The brake assembly according to claim 1, further comprising an auxiliary intake opening, symmetrically arranged on the opposite side of the rotor disc.

10. The brake assembly according to claim 1, wherein the impeller is interposed between the intake opening and the collection chamber having a filter therein.

* * * * *